US006964269B2

(12) United States Patent
Gschwind et al.

(10) Patent No.: US 6,964,269 B2
(45) Date of Patent: Nov. 15, 2005

(54) HEATING FLANGE FOR PREHEATING AIR IN AN INTAKE LINE OF AN INTERNAL COMBUSTION ENGINE

(75) Inventors: Thomas Gschwind, Bad Durkheim (DE); Thomas Weber, Kuhardt (DE); Mathias Proner, Karlsruhe (DE); Hans-Peter Bauer, Klingenmunster (DE)

(73) Assignee: DBK David + Baader GmbH, Kandel (DE)

( * ) Notice: Subject to any disclaimer, the term of this patent is extended or adjusted under 35 U.S.C. 154(b) by 0 days.

(21) Appl. No.: 10/394,433

(22) Filed: Mar. 21, 2003

(65) Prior Publication Data

US 2004/0003800 A1 Jan. 8, 2004

(30) Foreign Application Priority Data

Mar. 28, 2002 (DE) .......................................... 102 14 166

(51) Int. Cl.⁷ ................................................ F02M 3/13
(52) U.S. Cl. ...................................... 123/549; 123/556
(58) Field of Search ............................... 123/556, 549; 219/206–207

(56) References Cited

U.S. PATENT DOCUMENTS

| | | |
|---|---|---|
| 909,898 A | 1/1909 | Hertzbert et al. |
| 1,068,322 A | 7/1913 | Chruch et al. |
| 1,136,845 A | 4/1915 | Tate |
| 1,369,551 A | 2/1921 | Schmid |
| 1,456,018 A | 5/1923 | Wiegand |
| 1,724,481 A | 8/1929 | Heginbottom et al. |
| 1,931,379 A | 10/1933 | Graziano |
| 1,931,837 A | 10/1933 | Belanger |
| 2,115,634 A | 4/1938 | Kiesel |
| 2,177,840 A * | 10/1939 | Roualet .................. 123/179.21 |
| 2,320,528 A | 6/1943 | Loeffler et al. |
| 2,668,900 A | 2/1954 | Kwartz |
| 3,088,447 A | 5/1963 | Henderson |
| 3,492,457 A | 1/1970 | Subt |
| 3,625,190 A | 12/1971 | Boissevain |
| 3,868,058 A * | 2/1975 | Hoare ......................... 236/13 |
| 3,892,215 A | 7/1975 | Hickling et al. |
| 3,912,903 A | 10/1975 | Northrup, Jr. et al. |
| 4,020,812 A | 5/1977 | Hayward |
| 4,106,454 A | 8/1978 | Henlis |
| 4,108,125 A | 8/1978 | Marcoux et al. |
| 4,313,413 A | 2/1982 | Miyoshi |

(Continued)

FOREIGN PATENT DOCUMENTS

| | | |
|---|---|---|
| DE | 4410820 | 10/1994 |
| DE | 195 15 533 A1 | 11/1996 |

(Continued)

OTHER PUBLICATIONS

Beru Construction Drawing, Dec. 1998. (with Statement of Relevance).

*Primary Examiner*—Marguerite McMahon
(74) *Attorney, Agent, or Firm*—Michael Best & Friedrich LLP

(57) ABSTRACT

The present invention relates to a heating flange, in particular for preheating air in an intake line leading to an internal combustion engine. The heating flange comprises at least one heating element for heating the air flowing past said heating element, and a body for mechanically holding and electrically contacting said heating element. For providing an improved heating flange, which is used in particular for preheating air in an intake line leading to an internal combustion engine and which guarantees fast heating of the intake air as well as increased robustness and simplified mounting, said body comprises a fastening bow having a substantially U-shaped cross-section, and said heating element comprises at least one substantially U-shaped meander loop which is fixedly connected to the base of said fastening bow.

19 Claims, 7 Drawing Sheets

U.S. PATENT DOCUMENTS

| | | | |
|---|---|---|---|
| 4,359,974 A | 11/1982 | Igashira et al. | |
| 4,363,958 A | 12/1982 | Kobayashi et al. | |
| 4,368,380 A | 1/1983 | Igashira et al. | |
| 4,379,443 A | 4/1983 | Granger | |
| 4,395,994 A | 8/1983 | Goto et al. | |
| 4,463,721 A | 8/1984 | Hayashi et al. | |
| 4,501,255 A | 2/1985 | Van Der Ploeg et al. | |
| 4,651,702 A | 3/1987 | Nara et al. | |
| 4,667,645 A | 5/1987 | Gluckman | |
| 4,682,576 A | 7/1987 | Nakamura et al. | |
| 4,685,437 A | 8/1987 | Tanaka et al. | |
| 4,870,249 A | 9/1989 | Kayanuma et al. | |
| 4,944,260 A | 7/1990 | Shea et al. | |
| 5,347,966 A * | 9/1994 | Mahon et al. | 123/179.21 |
| 5,595,164 A | 1/1997 | Thimmesch | |
| 5,666,804 A | 9/1997 | Sekiya et al. | |
| 5,743,242 A | 4/1998 | Thimmesch | |
| 5,908,021 A | 6/1999 | Garcia | |
| 5,988,146 A * | 11/1999 | Anderson et al. | 123/549 |
| 5,990,459 A * | 11/1999 | Feustel et al. | 219/486 |
| 5,992,399 A * | 11/1999 | Anderson et al. | 123/549 |
| 6,031,204 A | 2/2000 | Prust et al. | |
| 6,040,557 A * | 3/2000 | Prust et al. | 219/206 |
| 6,054,678 A * | 4/2000 | Miyazaki | 219/237 |
| 6,073,615 A | 6/2000 | Anderson et al. | |
| 6,119,665 A | 9/2000 | Anderson et al. | |
| 6,242,712 B1 * | 6/2001 | Prust | 219/206 |
| 6,325,053 B1 * | 12/2001 | Zappador et al. | 123/549 |
| 6,329,641 B1 * | 12/2001 | Miyazaki et al. | 219/497 |
| 6,651,632 B2 | 11/2003 | Thimmesch | |
| 6,715,472 B2 | 4/2004 | Stephan et al. | |
| 6,789,530 B2 * | 9/2004 | Navalon Carretero et al. | 123/556 |

FOREIGN PATENT DOCUMENTS

| | | |
|---|---|---|
| DE | 100 26 339 A1 | 12/2001 |
| FR | 648536 | 12/1928 |
| FR | 771774 | 4/1934 |
| FR | 867019 | 9/1941 |
| GB | 194009 | 3/1923 |
| GB | 660829 | 11/1951 |
| GB | 667509 | 3/1952 |
| GB | 2067245 | 7/1981 |
| GB | 2 306 570 | 5/1997 |
| JP | 58075652 | 5/1983 |
| JP | 62-91649 | 4/1987 |
| WO | WO 00/34643 | 6/2000 |

* cited by examiner

HEATING FLANGE FOR PREHEATING AIR IN AN INTAKE LINE OF AN INTERNAL COMBUSTION ENGINE

BACKGROUND OF THE INVENTION

1. Field of the Invention

The present invention generally relates to a heating flange and more specifically to a heating flange for preheating air in an intake line leading to an internal combustion engine.

2. Description of the Related Art

Presently, for instance in diesel engines, the use of preswirl chambers is normally dispensed with to a large extent, and the preheating time can be reduced markedly by means of direct fuel injection under high pressure. In the case of lorries, preheating is normally dispensed with completely, and the temperature required for igniting the fuel is here achieved by strong air compression. This technique depends, however, to a high degree on the temperature and the density of the combustion air taken in. At low temperatures, the electric starter must rotate the engine until a temperature rise has taken place in the combustion chambers due to a plurality of compression processes and until ignition of the fuel is possible. Vehicles which are often operated at low temperatures and low air pressures are therefore equipped with systems heating the intake air prior to the starting operation. At present, such systems operate e.g. on the basis of gas burners.

These systems are, however, disadvantageous insofar as the content of the oxygen required for the future combustion of the fuel is reduced and that, in addition, the technical expenditure is comparatively high.

Hence, alternative electric heating systems are used, this kind of systems being disclosed e.g. in DE 100 26 339 A1 or in DE 195 15 533 C2. In particular the device for preheating air in an intake line leading to a diesel engine, which is shown in DE 100 26 339 A1 and which is provided with a switching unit controllable by means of a semiconductor device operating in a wear-free manner, permits the heating flange to be switched on and off an arbitrary number of times and at very short intervals, i.e. with comparatively high frequencies. Hence, the power of the heating flange can be adapted to the warm-up conditions of the internal combustion engine almost steplessly.

This preheating device is, however, problematic insofar as, due to the high currents flowing (up to 400 ampere and more), the heating flange has to satisfy very special requirements with respect to current endurance, temperature resistance and mechanical stability.

SUMMARY OF THE INVENTION

An improved heating flange, in particular for preheating air in an intake line leading to an internal combustion engine, is provided which guarantees fast heating of the intake air as well as increased robustness and simplified mounting.

In one embodiment, a heating flange, in particular for preheating air in an intake line leading to an internal combustion engine, is provided, said heating flange comprising at least one heating element for heating the air flowing past said heating element. The heating flange further comprises a body for mechanically holding and electrically contacting said heating element. The body has a fastening bow having a substantially U-shaped cross-section, and the heating element comprises at least one substantially U-shaped meander loop which is fixedly connected to the base of the fastening bow.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention which is illustrated in the accompanying drawings, wherein.

DETAILED DESCRIPTION OF THE INVENTION

The illustrated embodiments of the present invention will be described with reference to the figure drawings wherein like elements and structures are indicated by like reference numbers.

Figure 1:
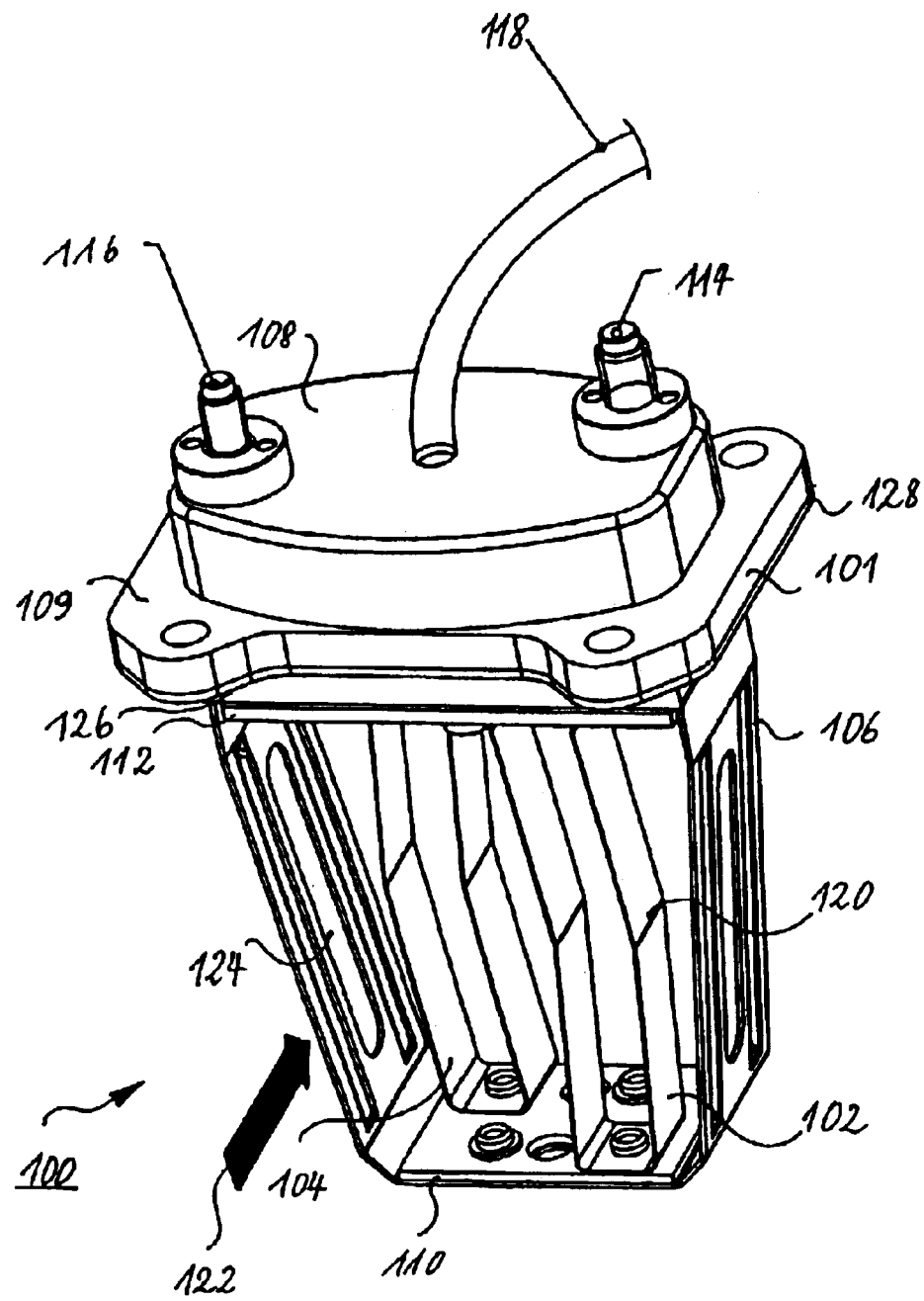
FIG. 1 is a perspective representation of a heating flange according to a first advantageous embodiment.

Referring now to the drawings and in particular to FIG. 1, a perspective representation of a heating flange according to the present invention in accordance with a first advantageous embodiment is shown. The heating flange 100 comprises a body 101 which is adapted to be mounted on an intake line in such a way that the two heating elements 102 and 104 are immersed in the air current to be heated, said intake line leading to an internal combustion engine. The heating elements 102, 104 are heated by an electric current flowing through same, whereby the air flowing around said heating elements will be heated.

In the embodiment shown, each of the two heating elements 102, 104 is defined by a substantially U-shaped meander loop. Such meander heating elements are particularly suitable for heating gaseous media, since, due to the direct contact with the heating conductor, a good heat transfer is given. The two heating elements 102, 104 are mechanically stabilized by a fastening bow 106. For secure fastening, the heating elements 102, 104 are connected to the base of the substantially U-shaped fastening bow 106 via riveted joints. In addition, each heating element 102, 104 is connected to the voltage supply.

The heating elements 102, 104 are electrically insulated from a support element 109, which is produced e.g. from aluminum, as well as from the fastening bow 106 by means of micanite boards 110, 112. A cover 108, which can preferably be produced from plastic material, serves to seal a respective opening in the intake line. The cover 108 has additionally integrated therein the connecting leads for power supply as well as the control electronics. A pin for the positive voltage 114, a pin for connection to ground 116 as well as the connecting cable 118 for the control are extended outwards. The two power-supply pins 114, 116 have a thread so that the cover 108 can be pressed onto the aluminum support element 109 by means of two suitable nuts.

In the installed condition of the heating flange, the cover 108 is sealed from the intake line through a flat gasket 128, which consists e.g. of silicon, in the present embodiment. It is, however, also possible to provide a double O-ring seal.

Since the heating elements 102, 104 are fixed in a mechanically rigid manner in the area of the support element 109 as well as in the area of the base of the fastening bow 106, it must be guaranteed that a defined change of position of the heating elements 102,104 relative to the fastening bow 106 will take place in the case of different thermal expansions of the heating elements 102, 104. For this purpose, the legs of the U-shaped meander loops of the heating elements 102,104 can be angled such that bends 120 are formed, which guarantee a directed, predetermined change of position when said legs increase in length. In this way, it can be guaranteed that the legs of the meander loops of the heating elements will move towards each other or come into contact with the fastening bow 106, whereby an electric short circuit will be caused in an extreme case. This resilient construction of the heating elements will also prevent said heating elements from breaking, e.g. due to engine vibrations.

As indicated by the arrow 122, it has to be assumed that the main flow direction of the air is a direction transversely to the U-shaped cross-section of the fastening bow 106. The legs of the fastening bow 106 are, however, provided with openings 124 permitting the air to be heated to flow in also in a direction transversely to the main flow direction 122. In the embodiment shown, the fastening bow 106 is conductively connected to the aluminum block 126 of the cover 108 and connected to ground. The insulation from the heating elements 102, 104 is effected by means of the insulation board 112.

Figure 2:
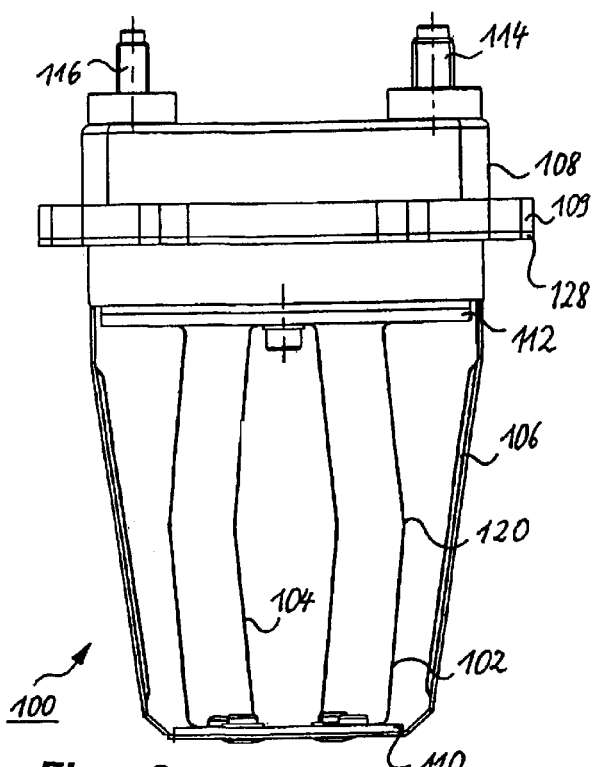
FIG. 2 illustrates a side view of the heating flange of FIG. 1.
Figure 3:
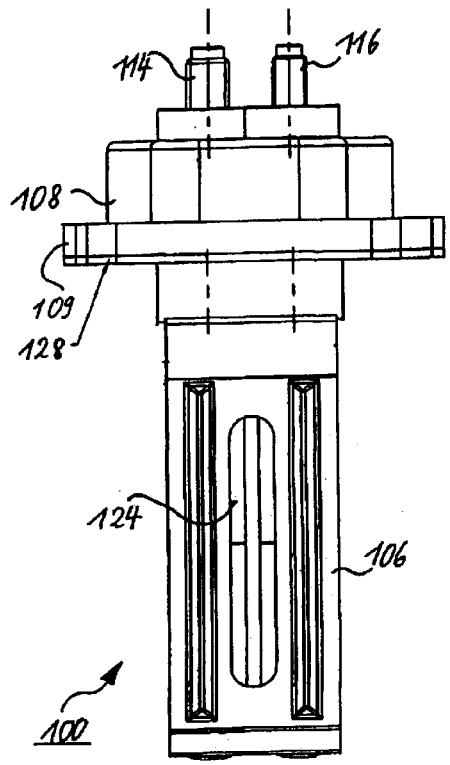
FIG. 3 is a side view of the heating flange of FIG. 2, rotated by 90°.
Figure 4:
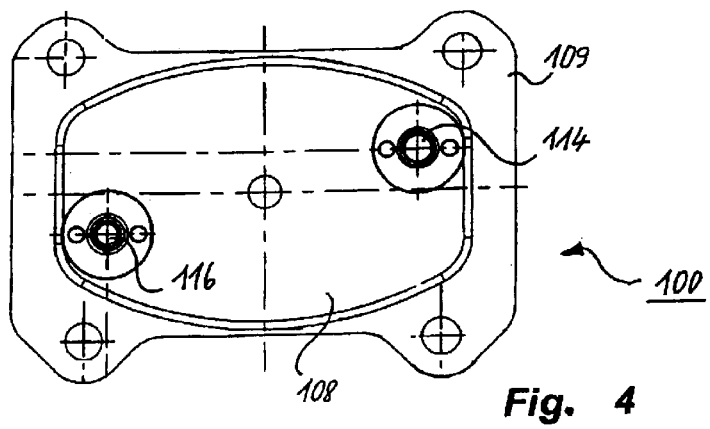
FIG. 4 illustrates a top view of the heating flange of FIG. 1.

Various views of the heating flange 100 according to the embodiment shown in FIG. 1 can be seen in FIGS. 2 to 4.

Figure 5:
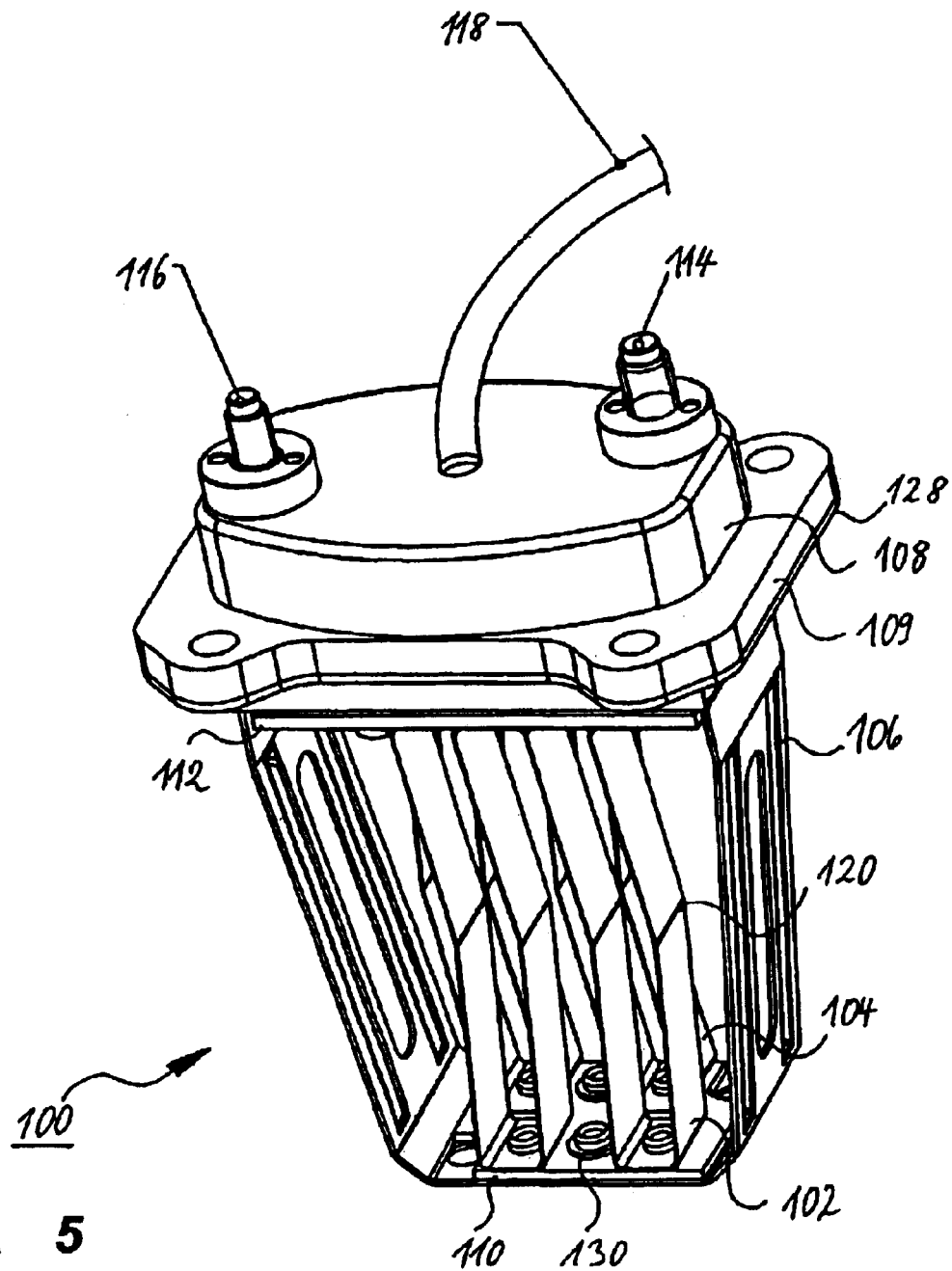
FIG. 5 illustrates a perspective representation of a heating flange according to a second advantageous embodiment.

FIG. 5 shows a perspective representation of a second advantageous embodiment in the case of which each heating element 102, 104 consists of two essentially U-shaped meander loops. In this embodiment, each heating element 102, 104 has a total of four heat-emitting legs immersed in the air current. Also in this embodiment, it will be expedient to provide bends 120 for obtaining a defined deflection in the case of thermal expansion.

When seen in a direction transversely to the U-shaped fastening bow 106, the two heating elements 102, 104 are arranged one behind the other and, in addition, displaced relative to one another in a direction parallel to the U-shaped cross-section of the fastening bow 106. The current of the air to be heated can, in this way, flow around the largest possible surface of the two heating elements 102, 104. Also in this embodiment, the heating elements 102, 104 are insulated from the base of the fastening bow 106 as well as from the aluminum block 126 of the cover 108 through micanite boards 110 and 112. The mechanical fixing of the heating elements 102, 104 as well as the fixing of the insulation board 110 to the base of the fastening bow 106 is effected by means of rivets 130.

Figure 6:
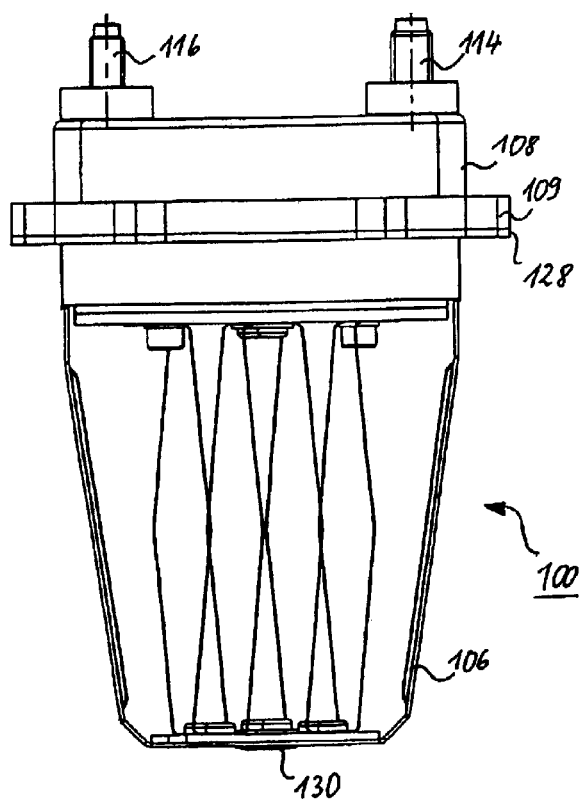
FIG. 6 illustrates a side view of the heating flange of FIG. 5.
Figure 7:
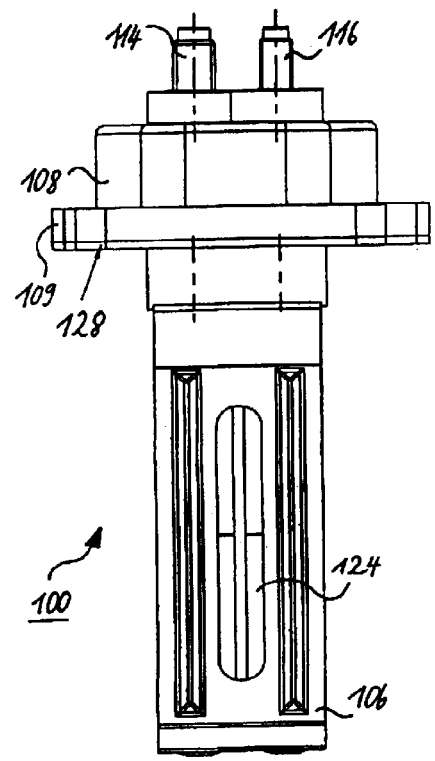
FIG. 7 is a side view of the heating flange of FIG. 6, rotated by 90°.
Figure 8:
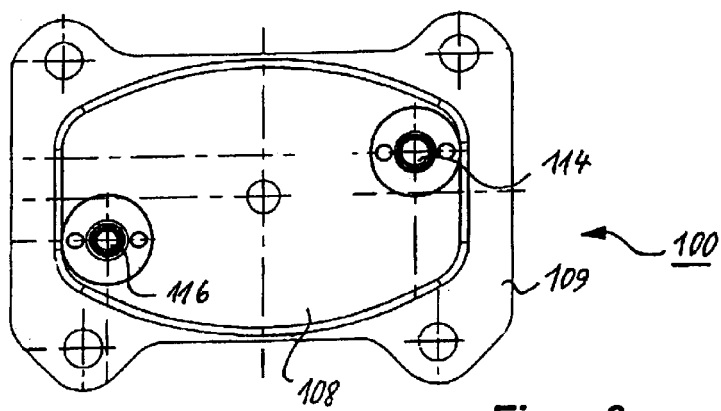
FIG. 8 is a top view of the heating flange of FIG. 5.

FIGS. 6 to 8 show various views of the heating flange 100 according to the embodiment shown in FIG. 5.

Figure 9:
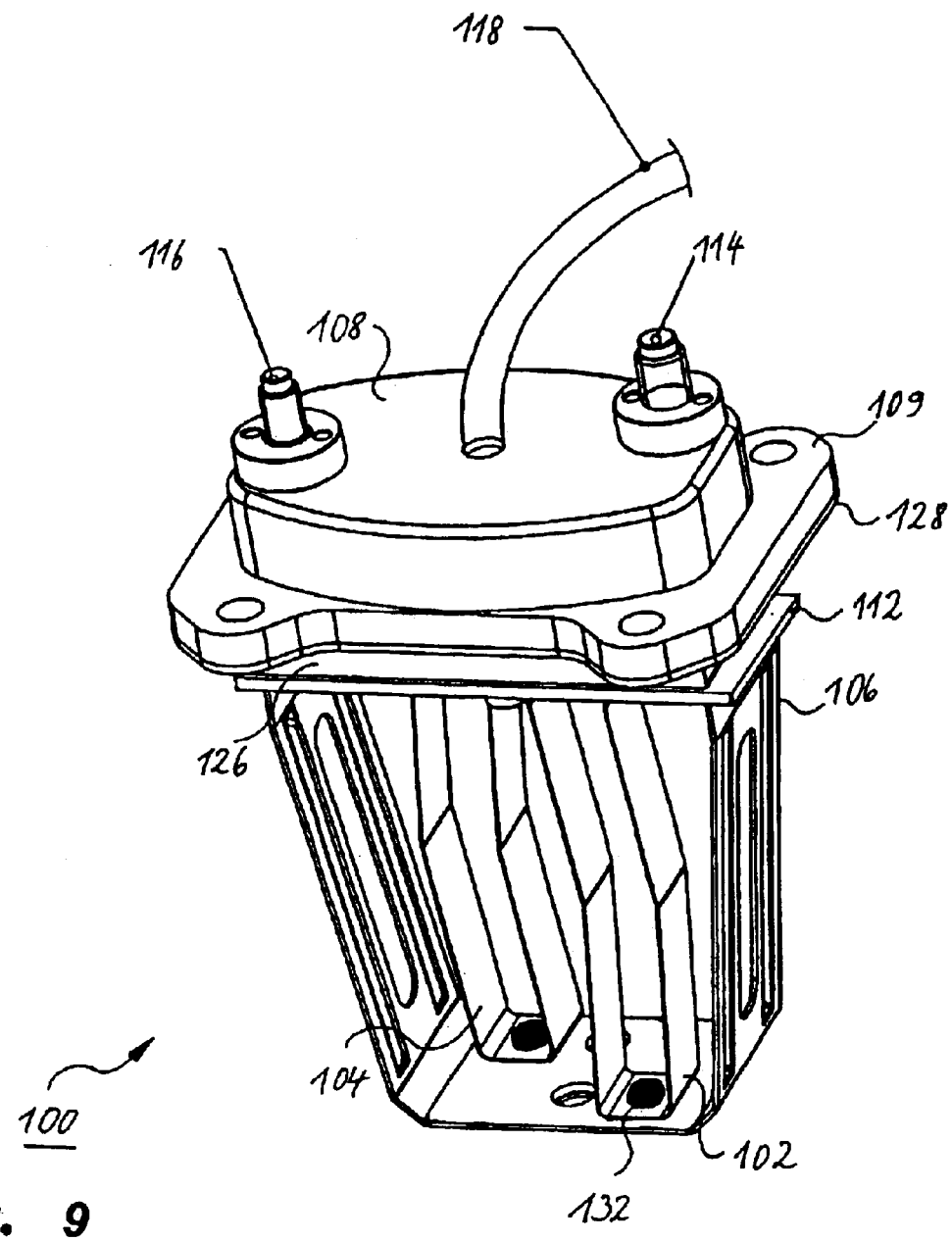
FIG. 9 shows a perspective view of a heating flange according to a third advantageous embodiment.

In FIG. 9 a perspective view of a heating flange 100 according to a third advantageous embodiment is shown. Other than in the case of the embodiments shown hereinbefore, the fastening bow 106 of this embodiment is not conductively connected to the aluminum block 126, but it is electrically insulated therefrom by an insulation 112. Since, in this embodiment, it is no longer necessary to electrically insulate the base of the U-shaped cross-section of the fastening bow 106 from the current-carrying heating elements 102, 104, it will suffice to provide welded joints 132 at the fastening bow 106 so as to mechanically fix the heating elements 102, 104, whereby the production can be facilitated and reduced in price still further. Although FIG. 9 shows an embodiment corresponding to FIG. 1 with only one meander loop per heating element 102, 104, it is, of course, also possible to use this embodiment for heating elements comprising more than one meander loop. The rivets 130 as well as the insulation 110 can be dispensed with in any case.

Figure 10:
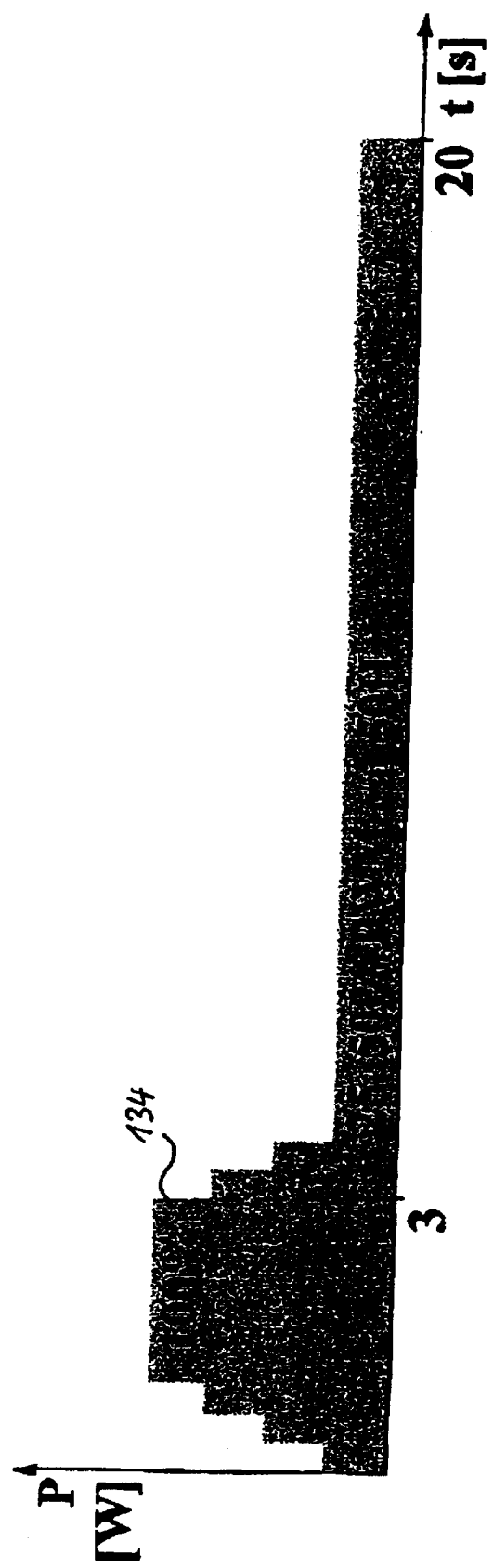
FIG. 10 is a time diagram of the electric power fed to the heating flange.

FIG. 10 shows exemplarily a typical time profile of the heating power when a diesel engine is being started. Prior to the starting moment 134, which occurs e.g. after three seconds, the intake air is preheated with 100% heating power. By controlled intermittent switching off of the heating power supply, a pulse width modulation can be achieved in a simple manner and, when the engine has been started, the air can still be heated for a predetermined period of time with a low heating power (e.g. 25% to 50%). This will make sense e.g. in cases where outdoor temperatures are very low, and in the example shown such heating is effected for a period of 20 seconds after switching on of the heating. The maximum electric heating power is in the range of approx. 10 kW. Due to this high power, particularly fast heating of the intake air prior to starting of the engine is guaranteed.

Figure 11:
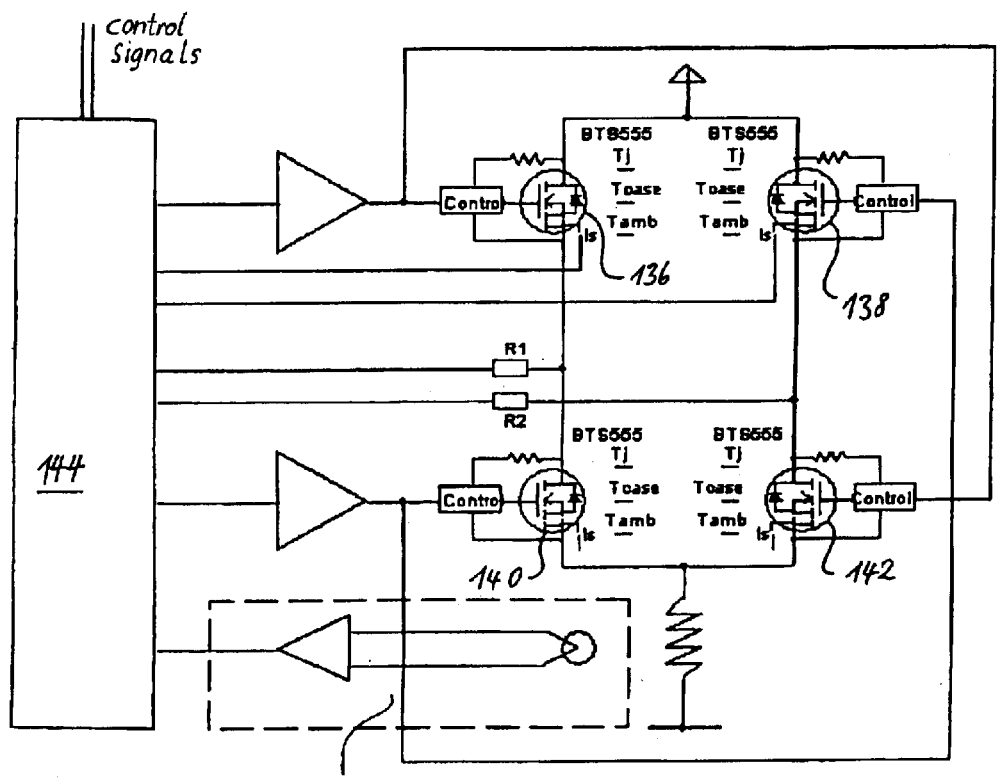
FIG. 11 is a circuit diagram of an electric switching means for controlling two heating elements.

FIG. 11 shows a circuit diagram of the electronic control for a heating flange with two heating elements. The use of two heating circuits and of fast, wear-free semiconductor switches 136, 138, 140 and 142 offers the possibility of controlling the heating power continuously and of permitting in this way a possibly necessary heating of the intake air with little power also when the engine is in operation.

When, as shown in FIG. 11, two semiconductor switching elements are used, which are in series with a heating element, the function of the semiconductors can be examined. Hence, a possibility of switching off is guaranteed and a fuse element can be dispensed with. If the current through a heating element exceeds the maximum current-carrying capacity of a MOSFET, it is also possible to connect a plurality of semiconductor switches in parallel.

The control electronics comprises a micro controller which prevents overloading of the heating circuits, supervises the function of said heating circuits and produces an indication signal in the case of malfunction. In addition, the electronics is capable of effecting controlled switching on of the heating circuits, if permanent excess voltages occur in the onboard power supply, so as to subject the onboard power supply to an electric load, whereby the excess voltage will be reduced. Optional temperature detection can be carried out via the temperature sensor 146 and, on the basis of this information, controlled intake-air preheating can be executed by means of the micro controller 144. Instead of the four semiconductor switches 136 to 142 shown, it is also possible to use a suitable single MOS field effect transistor.

Figure 12:
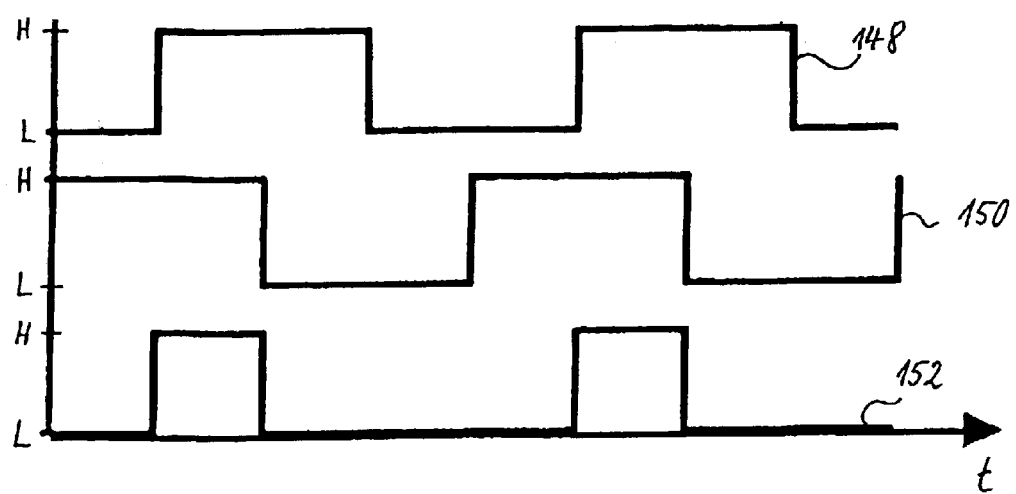
FIG. 12 shows a state diagram of the control status of the two heating elements as well as of the whole power fed.

FIG. 12 shows the variation with time of the control signals for the two heating elements and the resultant time profile of the on-off phases of the load. The two heating elements can, for example, be switched on and off in such a way that heating element 2 (cf. curve 150) is switched off, when heating element 1 (according to curve 148) has just reached half of its "ON" phase. The load is only switched on when both heating elements are switched on (curve 152). Such a temporally displaced control of the two heating elements will be advantageous, if it is e.g. desired to reduce the electromagnetic disturbances caused by the heating elements.

Various embodiments as described above may advantageously achieve a particularly good heat transfer between the heating element and the air to be preheated as well as a particularly robust and shake-proof construction of a heating flange, when the body comprises a fastening bow having a substantially U-shaped cross-section, and when the heating element comprises at least one substantially U-shaped meander loop which is fixedly connected to the base of said fastening bow. In this way, the heating element is mechanically protected in the best possible manner on the one hand and, on the other hand, the air to be heated flows around the largest possible area of the surface of said heating element. On the basis of this robust structural design, the heating element is resistant to the strong vibrations caused by the engine. Another advantage of the heating flange according to the present invention is that it can be mounted easily and therefore at a moderate price due to a small number of electrical and mechanical interfaces.

According to an advantageous embodiment, the heating element is electrically insulated from the fastening bow at the base of said bow. In this way, it is possible that the fastening bow has connected thereto a potential, e.g. ground, which is different from the potential of the heating element.

A particularly low-priced and effective possibility of realizing such an electric insulation is the arrangement of a substantially rectangular board consisting of an electrically insulating material, preferably mica, micanite or ceramics, between the heating element and the base of the fastening bow. When the material micanite is used for this purpose, this material offers the advantage of high dielectric strength (higher than 20 kV/mm), an admissible use temperature of 600° C. to 900° C., a very small water-absorbing capacity (less than 1%) as well as a good thermal conductivity. In addition, this material can be given the desired shape in a particularly easy way.

A method of establishing a connection between the fastening bow and the heating element, which is particularly safe under the rough environmental conditions to which said connection will be subjected when used in motor vehicles, is riveting.

Another very reliable connection between the heating element and the fastening bow is a welded joint, which is, in addition, particularly easy to produce and which saves on material.

Materials which are often used for heating elements are ferritic iron-chromium-aluminum alloys. The alloy Kanthal D®, a registered trademark of the firm of Kanthal AB, has e.g. a temperature stability of up to 1,300° C. and is frequently used for heating tasks in households as well as for industrial applications.

According to an advantageous embodiment, the body of the heating flange additionally comprises a cover through which the heating flange can be connected to the intake line. This permits a particularly simple mounting of the heating flange in the intake line. This cover can be sealed from the intake line e.g. by a flat gasket or by double O-rings arranged on said cover. Due to the fact that, in this embodiment, the fastening bow with the heating elements is fully immersed in the air current of the intake line, the air can be heated in a particularly effective manner.

According to another advantageous embodiment, the fastening bow is connected to the cover in an electrically conductive manner. Both the fastening bow and the cover can be connected to ground in this way and, consequently, they will not act an as antenna for the emission of possible electromagnetic disturbances caused by the control of the heating elements.

In an alternative embodiment, the fastening bow is electrically insulated from the cover. This offers the advantage that an electric insulating layer is no longer necessary between the fastening bow and the heating element, whereby the production can take place with less expenditure of time and material.

Normally, the material of the U-shaped meander loop of the heating element has a temperature coefficient which is different from that of the material used for producing the fastening bow. In addition, much higher temperatures are reached at the heating element. In order to be able to compensate the different degrees of expansion of the fastening bow and of the heating element when the heating flange is in operation, the legs of the U-shaped meander loop of the heating element are angled at least once in the freestanding area encompassed by the air current. This has the effect that the heating element is resiliently supported in the fastening bow so that said heating element is reliably fixed even in the case of strong vibrations and so that a deformation in a defined direction will be possible under the influence of heat.

According to an advantageous further development of the present invention, the heating flange comprises two heating elements which are arranged such that they are displaced relative to one another in a direction transversely to the U-shaped cross-section of the fastening bow. These two heating elements offer the advantage of an increased heating power and of a larger surface for heating the air flowing through.

In order to provide a heating element pattern which extends through the air volume in the most effective manner, the legs of the meander loop of the two heating elements can be angled in opposite directions.

For obtaining a particularly good heat transfer, the fastening bow can be provided with openings formed in the flanks thereof and used for allowing the air to be heated to flow in transversely to the opening of the U-shaped cross-section.

According to an advantageous embodiment, the heating flange is provided with a switching means for switching the electric power at the heating element on and off. With the aid of such a switching means, the electric power can be supplied to the heating element according to requirements and a pulse width modulation for controlling the heating power supply can be realized e.g. by defined switching on and off.

When a switching means comprising a semiconductor device is provided for switching on and off, this embodiment offers the advantage that the semiconductor device switches reliably and in a wear-free manner, that must higher switching frequencies can be realized and that the size of the switching means in its entirety can be markedly miniaturized in comparison with arrangements comprising a relay.

When at least two separately controllable heating elements are provided on the heating flange, which are each connected to a respective switching means for switching the electric power supply on and off, the two heating elements can be controlled independently of one another, whereby the flexibility of the control will be increased considerably.

It is, for example, possible to supply power to the two heating elements in a time-shifted manner in such a way that electromagnetic disturbances, which are caused by switching the heating elements on and off, will cancel one another when averaged over time. In view of the fact that the disturbance energy stored in the line inductance is proportional to the current flowing, the electromagnetic disturbance will be reduced accordingly by the division of the currents.

A micro controller used for controlling the power supply to the heating element guarantees flexibly adjustable heating characteristics which are adapted to the engine properties in the best possible way. In addition, the microcontroller can take over the following functions:

safety cut-off when a maximum temperature or maximum power-on period has been reached, supervision of the semiconductor switching elements, triggering safety cut-off devices, determining the current flowing, and detecting transition resistances in this way, diagnostic functions reducing the electromagnetic radiation by suitable control algorithms.

When at least one temperature sensor is provided for detecting respective temperature values occurring, e.g. temperature values of the air to be heated, but also the outdoor temperature or the like, this solution offers the advantage that not only an open-loop control but also a closed-loop control of the heating process can be carried out and that said heating process can, consequently, be executed in a particularly power-saving and efficient mode. Such a temperature sensor can also by used for protecting the electronics against overheating.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

In particular, it is also possible to use an optical sensor which detects infrared light. By means of such an optical sensor, it would be possible to supervise the glowing up of the heating elements and to control it accordingly. This would permit a maximum power supply, which would be adapted to the air current in question, and it would not be necessary to detect the air current by complicated means and measures. Furthermore, a safe mode of operation will be possible, if the air current should fail to arrive.

In addition, those areas in which it is believed that those ordinary skilled in the art are familiar have not been described herein in order not to unnecessarily obscure the invention described herein.

Accordingly, it is to be understood that the invention is not to be limited by the specific illustrated embodiments but only by the scope of the appended claims.

What is claimed is:

1. A heating flange, in particular for preheating air in an intake line leading to an internal combustion engine, said heating flange comprising:

at least one heating element for heating the air flowing past said heating element, and a body which mechanically holds electrically contacts said heating element, wherein said body comprises a fastening bow having a substantially U-shaped cross-section, and the heating element comprises at least one substantially U-shaped meander loop which is fixedly connected to the base of said fastening bow, wherein said heating element is electrically insulated from the fastening bow at the base of said bow, and wherein a substantially planar, electrically insulating board is arranged between the heating element and the base of the fastening bow.

2. The heating flange according to claim 1, wherein said insulating board consists of mica.

3. The heating flange according to claim 1, wherein said insulating board consists of micanite.

4. The heating flange according to claim 1, wherein said insulating board consists of ceramics.

5. The heating flange according to claim 1, wherein said insulating board has a substantially rectangular shape.

6. The heating flange according to claim 1, wherein the body of the heating flange additionally comprises a cover through which the heating flange can be connected to the intake line.

7. The heating flange according to claim 6, wherein the fastening bow is connected to the cover in an electrically conductive manner.

8. The heating flange according to claim 6, wherein the fastening bow is electrically insulated from the cover.

9. A heating flange, in particular for preheating air in an intake line leading to an internal combustion engine, said heating flange comprising:

at least one heating element for heating the air flowing past said heating element, and a body which mechanically holds and electrically contacts said heating element, wherein said body comprises a fastening bow having a substantially U-shaped cross-section, and the heating element comprises at least one substantially U-shaped meander loop which is fixedly connected to the base of said fastening bow, wherein the legs of the U-shaped meander loop of the heating element are angled at least once in the freestanding area encompassed by the air current.

10. The heating flange according to claim 9, wherein the heating flange comprises a first and a second heating element, said heating elements being arranged such that they are displaced relative to one another in a direction transversely to the U-shaped cross-section of the fastening bow.

11. The heating flange according to claim 10, wherein the legs of the meander loop of the first heating element are angled in the freestanding, air current-encompassed areas thereof in a direction opposite to the direction in which the legs of the meander loop of the second heating element are angled.

12. A heating flange, in particular for preheating air in an intake line leading to an internal combustion engine, said heating flange comprising:

at least one heating element for heating the air flowing past said heating element, and a body which mechanically holds and electrically contacts said heating element, wherein said body comprises a fastening bow having a substantially U-shaped cross-section, and the heating element comprises at least one substantially U-shaped meander loop which is fixedly connected to the base of said fastening bow, wherein the fastening bow is provided with openings formed in the flanks thereof and used for allowing the air to be heated to flow in transversely to the opening of the U-shaped cross-section.

13. The heating flange according to claim 12, wherein a switching means is provided for switching the electric power at the heating element on and off.

14. The heating flange according to claim 13, wherein the electric switching means comprises at least one semiconductor device.

15. The heating flange according to claim 14, further comprising at least two separately controllable heating elements which are each connected to a respective switching means for switching the electric power supply on and off.

16. The heating flange according to claim 15, wherein the heating elements have power supplied thereto in a time-shifted manner.

17. The heating flange according to claim 12, wherein the power supply of the heating element is controlled by means of a micro controller.

18. The heating flange according to claim 12, further comprising at least one temperature sensor for detecting temperature values occurring.

19. The heating flange according to claim 18, wherein said at least one temperature sensor detects temperature values of the air to be heated.

* * * * *